US011313614B2

(12) United States Patent
Scalf (10) Patent No.: US 11,313,614 B2
(45) Date of Patent: Apr. 26, 2022

(54) METHOD AND APPARATUS FOR SEALING FRENCH DOORS FOR A FREEZER COMPARTMENT

(71) Applicant: Midea Group Co., Ltd., Foshan (CN)

(72) Inventor: Eric Scalf, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 93 days.

(21) Appl. No.: 16/578,885

(22) Filed: Sep. 23, 2019

(65) Prior Publication Data
US 2020/0018539 A1 Jan. 16, 2020

Related U.S. Application Data

(62) Division of application No. 15/811,071, filed on Nov. 13, 2017, now Pat. No. 10,422,571.

(51) Int. Cl.
| F25D 23/06 | (2006.01) |
| F25D 23/02 | (2006.01) |
| F25D 23/08 | (2006.01) |
| F25D 25/02 | (2006.01) |

(52) U.S. Cl.
CPC .......... *F25D 23/065* (2013.01); *F25D 23/02* (2013.01); *F25D 23/069* (2013.01); *F25D 23/08* (2013.01); *F25D 23/087* (2013.01); *F25D 25/024* (2013.01); *F25D 2323/021* (2013.01)

(58) Field of Classification Search
CPC .. F25D 23/065; F25D 23/028; F25D 2201/14; F25D 2201/12
See application file for complete search history.

(56) References Cited

U.S. PATENT DOCUMENTS

| 3,726,578 A | * | 4/1973 | Armstrong | ............ F25D 17/062 312/407 |
| 3,942,853 A | * | 3/1976 | Grimm | ................... F25D 11/02 312/296 |
| 4,040,166 A | * | 8/1977 | Morphy | ................ F25D 23/064 29/460 |
| 4,120,550 A | * | 10/1978 | Sherburn | ................ F25D 23/02 312/296 |
| 4,330,310 A | * | 5/1982 | Tate, Jr. | .................. F25D 21/04 312/407 |
| 4,578,902 A | * | 4/1986 | Niekrasz | ................. A47F 3/043 49/382 |

(Continued)

FOREIGN PATENT DOCUMENTS

| CN | 2150295 Y | 12/1993 |
| CN | 1401958 A | 3/2003 |

(Continued)

OTHER PUBLICATIONS

International Search Report and Written Opinion issued in Application No. PCT/CN2018/074267 dated Jul. 27, 2018.

(Continued)

*Primary Examiner* — Kun Kai Ma
(74) *Attorney, Agent, or Firm* — Middleton Reutlinger (57) ABSTRACT

An appliance having at least a freezer compartment. The appliance may include a pair of freezer doors accessing the freezer compartment. The freezer compartment may include one or more freezer shelves. A mullion may include a movable portion and a fixed portion for sealing the pair of freezer doors.

14 Claims, 5 Drawing Sheets

(56) References Cited

U.S. PATENT DOCUMENTS

| | | | |
|---|---|---|---|
| 4,711,098 A | | 12/1987 | Kuwabara et al. |
| 5,816,080 A | | 10/1998 | Jeziorowski |
| 5,975,661 A | | 11/1999 | Jeziorowski et al. |
| 5,975,664 A | | 11/1999 | Banicevic et al. |
| 5,992,960 A | * | 11/1999 | Wolanin .................. F25D 21/04 312/265.5 |
| 6,019,447 A | * | 2/2000 | Jackovin ................ F25D 11/02 312/405 |
| 6,578,978 B1 | * | 6/2003 | Upton ..................... A47F 3/001 362/125 |
| 7,284,390 B2 | | 10/2007 | Van Meter et al. |
| 7,726,756 B2 | * | 6/2010 | Fu .......................... F25D 23/069 312/405 |
| 8,770,682 B2 | * | 7/2014 | Lee ........................ F25D 23/028 312/291 |
| 9,234,695 B1 | * | 1/2016 | Dubina .................. F25D 23/028 |
| 9,523,522 B2 | | 12/2016 | Chou et al. |
| 9,995,528 B1 | * | 6/2018 | Ebrom .................... G03B 17/04 |
| 2004/0012315 A1 | * | 1/2004 | Grace ..................... F25D 23/062 312/406 |
| 2006/0152125 A1 | * | 7/2006 | Anderson ............. F25D 23/065 312/406.2 |
| 2008/0209812 A1 | * | 9/2008 | Lancry ................... F25D 21/04 49/316 |
| 2012/0285971 A1 | * | 11/2012 | Junge .................... F25D 23/065 220/592.02 |
| 2013/0241385 A1 | | 9/2013 | Lee et al. |
| 2014/0033756 A1 | * | 2/2014 | Kuehl ..................... F25D 21/14 62/281 |
| 2014/0265804 A1 | * | 9/2014 | Wilson .................. F25D 23/028 312/405 |
| 2015/0168048 A1 | * | 6/2015 | Sexton .................. F25D 23/062 62/329 |
| 2015/0241117 A1 | * | 8/2015 | Burke ................... F25D 23/069 312/404 |
| 2016/0290702 A1 | * | 10/2016 | Sexton .................. F25D 23/026 |
| 2016/0290705 A1 | * | 10/2016 | Jenkinson ............... F25D 25/02 |
| 2016/0341462 A1 | | 11/2016 | Kim |
| 2016/0348957 A1 | * | 12/2016 | Hitzelberger ........... F25D 23/02 |
| 2017/0059235 A1 | * | 3/2017 | Dixon .................... F25D 23/02 |
| 2017/0122654 A1 | | 5/2017 | Lee et al. |
| 2017/0176094 A1 | * | 6/2017 | Giacomini ............ F25D 23/021 |
| 2017/0191743 A1 | | 7/2017 | Lee et al. |
| 2017/0191744 A1 | | 7/2017 | Koo |
| 2017/0191745 A1 | | 7/2017 | Choi |
| 2017/0191746 A1 | | 7/2017 | Seo |
| 2019/0049170 A1 | * | 2/2019 | Reuter .................. F25D 23/028 |

FOREIGN PATENT DOCUMENTS

| | | | |
|---|---|---|---|
| CN | 102695933 A | | 9/2012 |
| CN | 104024773 A | | 9/2014 |
| CN | 204787559 U | | 11/2015 |
| CN | 105371556 A | * | 3/2016 |
| CN | 105371556 A | | 3/2016 |
| JP | H02133784 A | | 5/1990 |
| JP | 2000079027 A | | 3/2000 |
| JP | 2017020754 A | | 1/2017 |
| WO | 2009072773 A2 | | 6/2009 |
| WO | 2012140854 A1 | | 10/2012 |
| WO | 2017119614 A1 | | 7/2017 |

OTHER PUBLICATIONS

China National Intellectual Property Administration, First Examination Opinion issued in China Application No. 201880071684.0, dated Mar. 26, 2021, 12 pages.

* cited by examiner

METHOD AND APPARATUS FOR SEALING FRENCH DOORS FOR A FREEZER COMPARTMENT

BACKGROUND

The present embodiments relate to a method and apparatus for sealing French doors for a freezer compartment integrated into an appliance.

Typical French doors for use on a freezer include a vertical case between two freezer compartments to seal the French doors, thereby creating a left and right side freezer compartment. The remaining case completely surrounds each freezer compartment. However, this practice when French doors are used on the freezer compartment reduces the size (e.g. width) of each freezer compartment, meaning a single freezer compartment (e.g. left or right) does not extend fully across the appliance. Moreover, the internal freezer shelves are correspondingly sized to the individual, left or right, freezer compartment (e.g. half width compartment) and do not extend typically beyond the width of a single door, as such they do not extend fully across the width of the appliance. Moreover, if an articulating mullion is attached to one of the freezer doors the price and complexity may adversely increase. Thus, there is a need to seal a full width freezer compartment with French doors and still be able to deploy one or more shelves or bin compartments though the opening allowed by both doors in the open position instead of limiting the width of the freezer shelf.

SUMMARY

In some embodiments of the invention, for example, an appliance having at least a freezer compartment may comprise a housing. Moreover, the housing may include at least a freezer compartment and may define an opening into the freezer compartment. In various embodiments, the appliance may include a pair of freezer doors rotatably attached adjacent the opening into the freezer compartment to the housing, each of the freezer doors may have an open position and a closed position to allow access to the freezer compartment. In some embodiments, the appliance may include one or more freezer shelves slidably mounted within the freezer compartment, wherein the one or more freezer shelves may be disposed within the freezer compartment when the one or more freezer shelves are in a closed position and is at least partially disposed outside the freezer compartment when the one or more freezer shelves are in an open position and each of the freezer doors are in the open position. In addition, in some embodiments, the appliance may include a mullion separating the opening into a pair of openings. In various embodiments, the mullion may include a fixed portion and a movable portion combining to provide a sealing surface for receipt of the pair of freezer doors. In some embodiments, the movable portion of the mullion may be positionable relative to the fixed portion of the mullion between a sealed position and an unsealed position different from the sealed position, wherein when the one or more freezer shelves are in the closed position the movable portion may be in the sealed position and the pair of freezer doors may sealingly engage the sealing surface of the combined fixed portion and the movable portion of the mullion, and wherein when the one or more shelves are in the open position the movable portion is in the unsealed position.

In some embodiments, the one or more freezer shelves may pivot the movable portion of the mullion at least from the sealed position. In various embodiments, the movable portion of the mullion may pivot between the sealed position and the unsealed position. In addition, in some embodiments, the movable portion may pivot about a hinge, wherein a pivot axis of the hinge is substantially horizontal. In various embodiments, the movable portion of the mullion may be fixedly attached to the one or more freezer shelves, wherein the movable portion of the mullion travels with the one or more freezer shelves from the closed position to the open position. In some embodiments, the appliance may include a heater adjacent the mullion. Moreover, in various embodiments, the one or more freezer shelves may have a width larger than a width of the opening within the freezer compartment covered by at least one freezer door when the freezer door may be in the closed position. In some embodiments, the appliance may further comprise a fresh-food compartment.

In various embodiments, a shelf system for at least a freezer compartment having a pair of French doors may comprise one or more freezer shelves each having a front side and an opposing back side. In some embodiments, one or more freezer shelves may be slidably mounted within a freezer compartment. In various embodiments, the freezer shelf may be disposed within the freezer compartment when the freezer shelf is in a closed position and is at least partially deployed outside the freezer compartment when the freezer shelf is in an open position. Moreover, in some embodiments, at least one portion of a mullion may be in a sealed position and disposed in front of the front side of the one or more freezer shelves when in the closed position. In some embodiments, deployment of one or more freezer shelves from the closed position to the open position may displace the at least one portion of the mullion to an unsealed position.

In addition, in some embodiments, at least one portion of the mullion may return to the sealed position when positioning one or more freezer shelves to the closed position. In various embodiments, at least one portion of the mullion may be attached to the one or more freezer shelves and may be positionable between the closed position and the open position with one or more freezer shelves. In various embodiments, the mullion may further comprise a fixed portion, wherein at least one portion in the sealed position and the fixed portion of the mullion may combine to provide a sealing surface for receipt of a pair of freezer doors. In addition, in some embodiments, at least one portion of the mullion may be pivoted between the sealed position and the unsealed position. In some embodiments, the shelf system may be in combination with an appliance having the freezer compartment.

In various embodiments, a method of sealing French doors on a freezer compartment may comprise the step of providing a freezer compartment with an opening thereto. In some embodiments, the method may include providing a pair of freezer doors rotatably attached adjacent the opening into the freezer compartment to the housing, each of the freezer doors having an open position and a closed position to allow access to the freezer compartment. In addition, in some embodiments, the method may include providing one or more freezer shelves mounted within the freezer compartment, wherein the freezer shelf may be disposed within the freezer compartment when the freezer shelf is in a closed position and is at least partially disposed outside the freezer compartment when the freezer shelf is in an open position and each of the freezer doors are in the open position. In various embodiments, the method may include providing a mullion separating the opening into a pair of openings, wherein the mullion may include a fixed portion and a movable portion combining to provide a sealing surface for receipt of the pair of freezer doors. In some embodiments, the method may include moving the one or more freezer shelves from the closed position to the open position may reposition the movable portion of the mullion from a sealed position to an unsealed position.

In addition, in some embodiments, the method may include moving the one or more freezer shelves from the open position to the closed position may reposition the movable portion of the mullion from the unsealed position to the sealed position. In various embodiments, the step of moving the one or more freezer shelves from the closed position to the open position may include the step of pivoting the movable portion of the mullion from the sealed position to the unsealed position. In some embodiments, the step of pivoting the movable portion of the mullion from the sealed position to the unsealed position may include pivoting the movable portion about a pivot axis that is either vertically or horizontally orientated. In some embodiments, the movable portion of the mullion may be fixedly attached to the one or more freezer shelves. In some embodiments, wherein the step of moving the one or more freezer shelves from the closed position to the open position includes the step of sliding the movable portion of the mullion with the one or more freezer shelves between the sealed position to the unsealed position. In various embodiments, the method may include the step of heating the mullion.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Numerous variations and modifications will be apparent to one of ordinary skill in the art, as will become apparent from the description below. Therefore, the invention is not limited to the specific implementations discussed herein.

The embodiments discussed hereinafter will focus on the implementation of the hereinafter-described techniques and apparatuses within a residential refrigerator appliance such as refrigerator appliance 10, such as the type that may be used in single-family or multi-family dwellings, or in other similar applications. However, it will be appreciated that the herein-described techniques and apparatuses may also be used in connection with other types of refrigerator appliances in some embodiments. For example, the herein-described techniques may be used in commercial applications in some embodiments. Moreover, the herein-described techniques may be used in connection with various refrigerator appliance configurations. Implementation of the herein-described techniques within refrigerators, bottom freezer refrigerators, top freezer refrigerators, wine refrigerators and beverage centers, compact refrigerators, standing freezers, side by side refrigerator, etc. using French doors would be well within the abilities of one of ordinary skill in the art having the benefit of the instant disclosure, so the embodiments are not limited to the bottom freezer refrigerator implementation discussed further herein. In some embodiments, the appliance or device utilizing the sealing method and apparatus for a cavity or compartment need not be a freezer, or even refrigerated.

Figure 1:
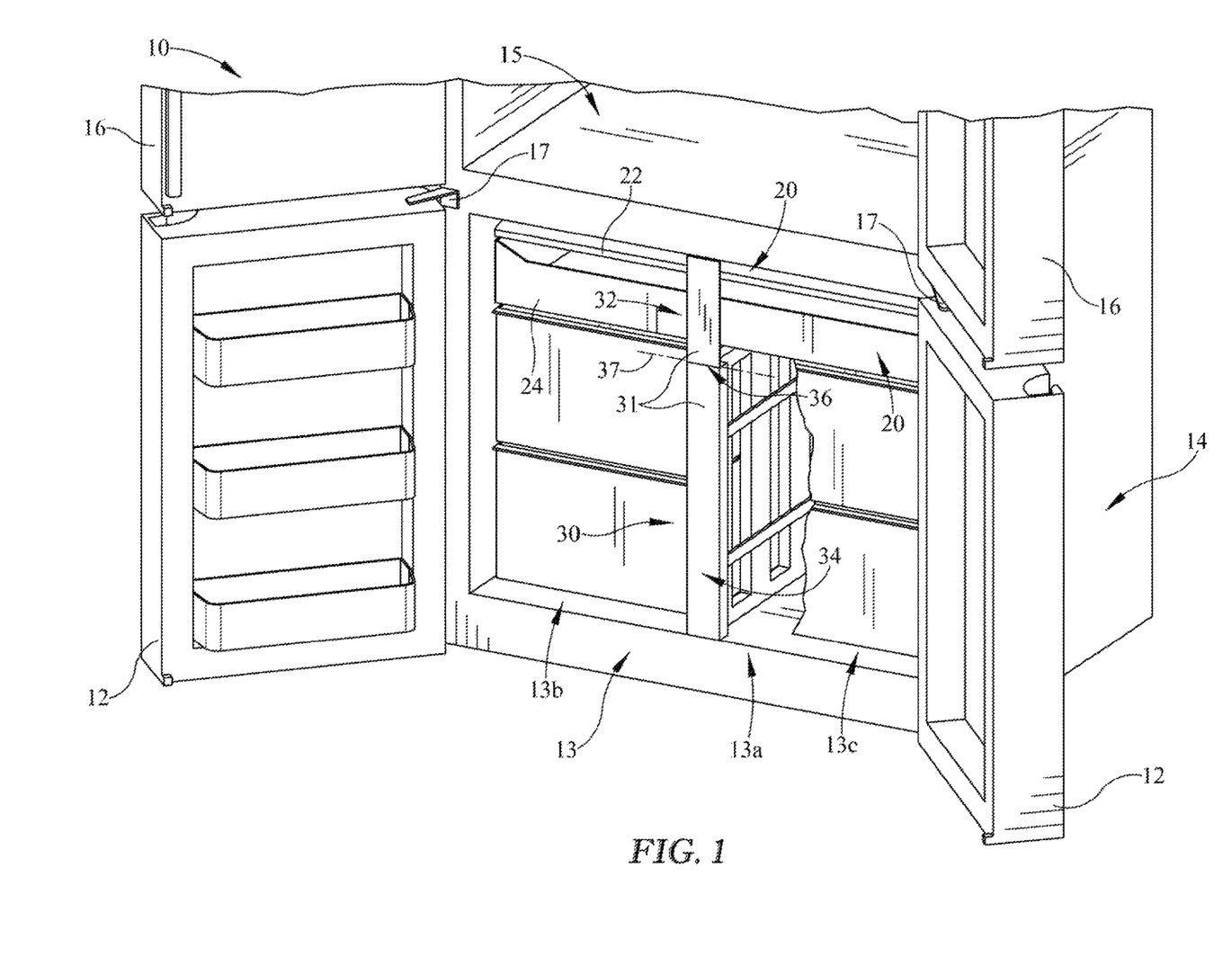
FIG. 1 is an enlarged front perspective view of one embodiment of an appliance, with portions of the appliance broken away, having at least a freezer compartment illustrating one or more shelves in a closed position and an embodiment of a movable portion of a mullion in a sealed position.

Turning now to the drawings, FIG. 1 illustrates an example refrigerator appliance 10 in which the various technologies and techniques described herein may be implemented. Refrigerator appliance 10 is depicted in this example as a four-door or T-type refrigerator, and as such includes front-mounted French doors 12 in a cabinet or housing 14 that provides access to the freezer compartment 13 housed within the cabinet or housing 14. Similarly adjacent pivotable French doors 16 may provide access to the fresh-food compartment 15 and when in the open position (FIG. 1), food and beverage items may be inserted into and removed from the fresh-food compartment 15. French doors 12 are rotatably attached to the housing 14 adjacent the freezer compartment 13 and/or opening 13a. French doors 12 are generally provided with a hinge 17 along a corresponding side or front edge of the housing 14 adjacent the freezer compartment 13 and is pivotable between a closed position (not shown) and an open position illustrated in FIGS. 1-5. When French doors 12 are in the open position, food and beverage items may be inserted into and removed from the freezer compartment 13 through the French doors 12 or, alternatively, through an opening in the door 12. Moreover, when the French doors 12 are in the open position, one or more compartment bins, baskets, or shelves 20 may be deployed from the freezer compartment 13.

Control over refrigerator appliance 10 by a user is generally managed through a control panel, which can be disposed on a door such as a doors 12, 16. Control panel can also be disposed within the freezer compartment 13 in another embodiment, or in multiple doors, and can be utilized with a user interface for the refrigerator appliance 10. It will be appreciated that in different refrigerator appliance designs, the control panel may include various types of input and/or output devices, including various knobs, buttons, lights, switches, textual and/or graphical displays, touch screens, etc. through which a user may configure one or more settings.

Figure 3:
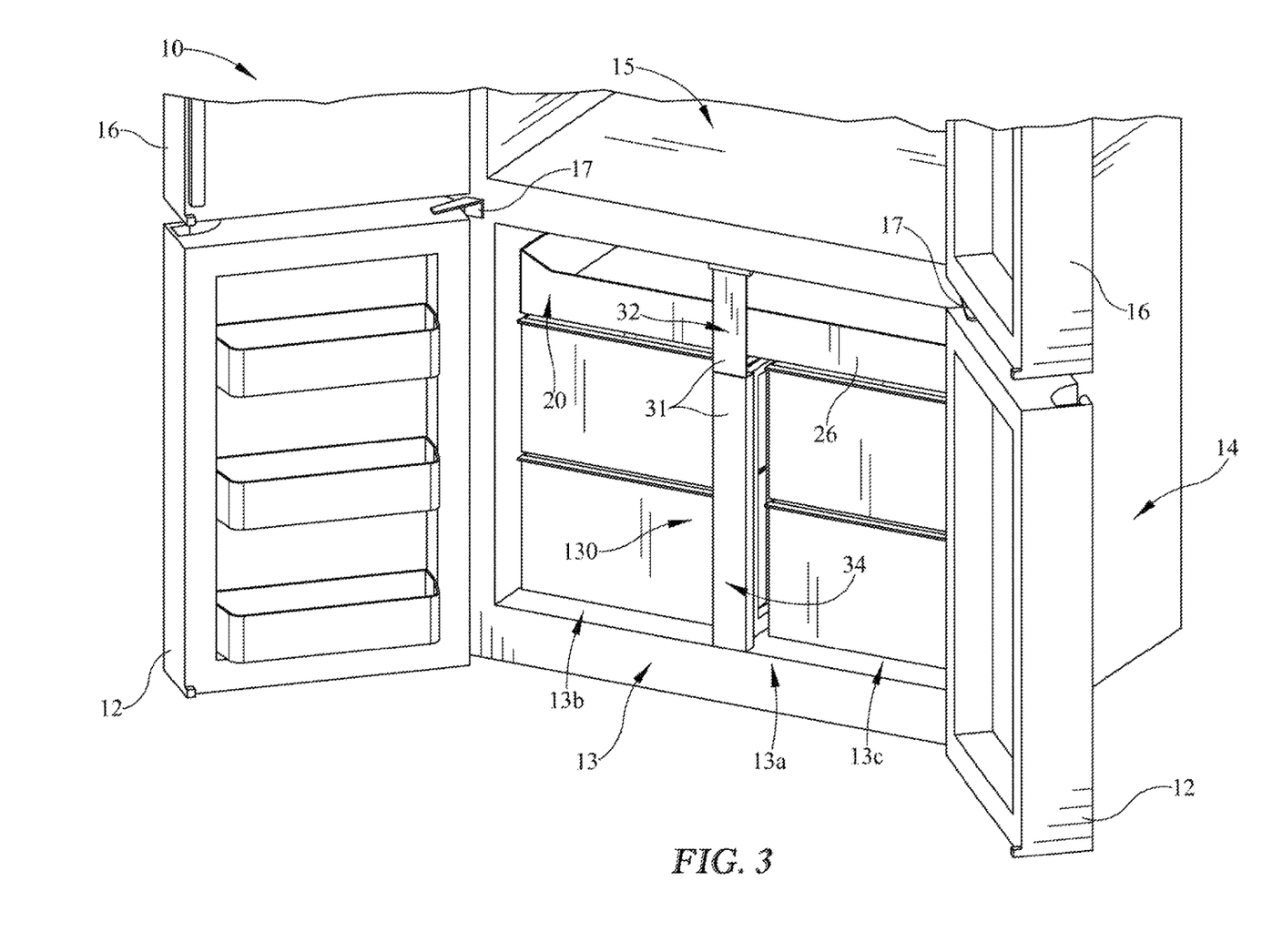
FIG. 3 is an enlarged front perspective view of an appliance, with portions of the appliance broken away, illustrating one or more shelves in a closed position and another embodiment of a movable portion of a mullion in a sealed position.
Figure 4:
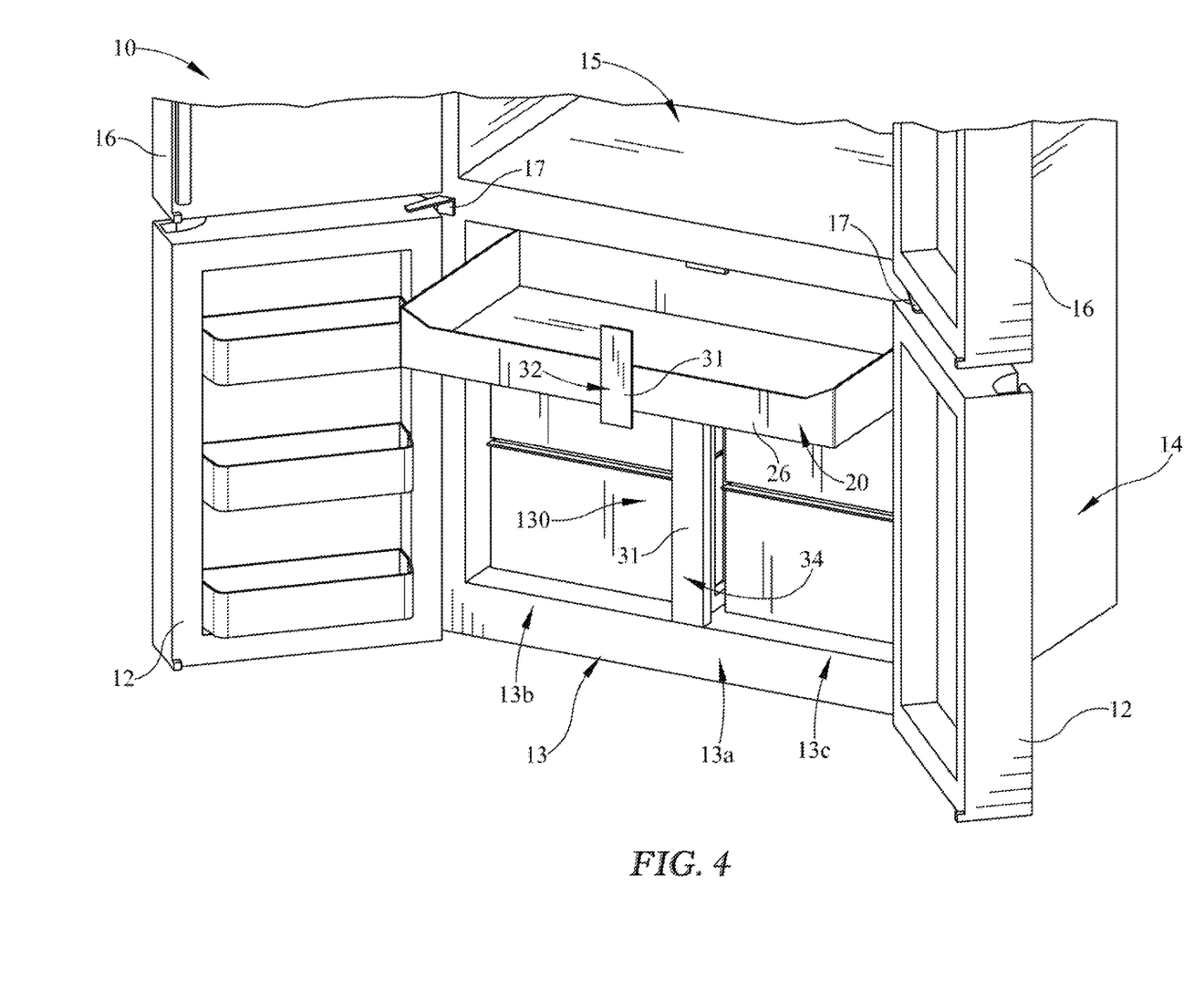
FIG. 4 is an enlarged front perspective view of the embodiment shown in FIG. 3 illustrating the one or more shelves in an open position and the movable portion of the mullion in an unsealed position.
Figure 5:
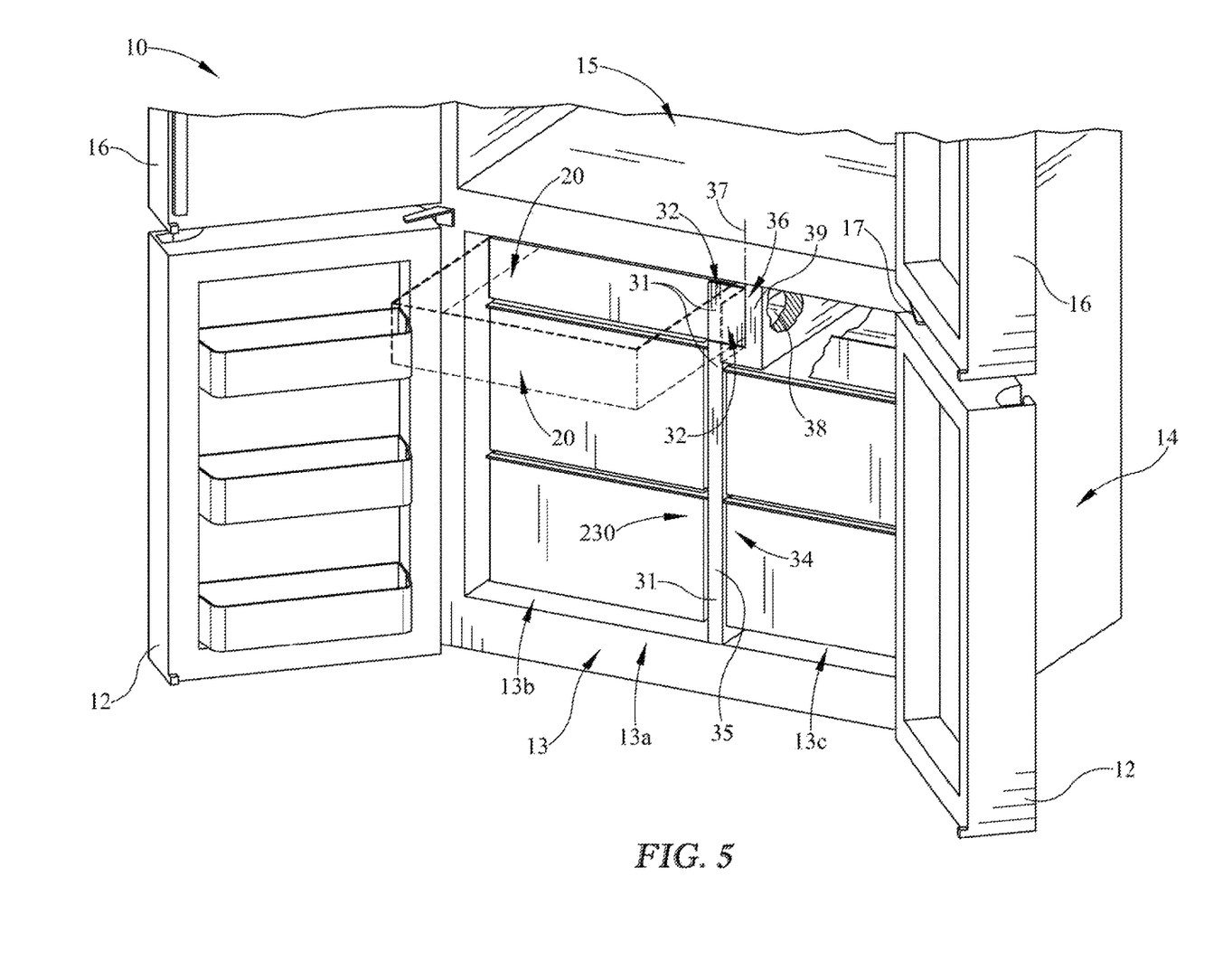
FIG. 5 is an enlarged front perspective view of an appliance, with portions of the appliance broken away, illustrating in solid lines one or more shelves in a closed position and another embodiment of a movable portion of a mullion in a sealed position and in broken lines one or more shelves in an open positon and the movable portion of the mullion in an unsealed position.

As shown in the Figures, the substantially full width freezer compartment 13 may be subdivided by one or more partitions or mullions 30, 130, 230 adapted to seal the one or more French doors 12. The mullion 30, 130, 230 provides a sealing surface 31 for the receipt of one or more of the French doors 12 (e.g. one or more gaskets). The freezer compartment 13 may extend substantially across the width of the appliance 10 as shown, or alternately may be a variety of sizes (e.g. widths), shapes, quantities, constructions, etc., and still be within the scope of the invention herein. The outer case or housing 14 surrounding the freezer compartment 13 may define an opening 13a into the freezer compartment. The mullion 30, 130, 230 may intersect the opening 13a in one or more configurations with a variety of positions/orientations. As shown in FIGS. 1-4, the mullion 30, 130 is substantially vertical and/or aligned centrally within the opening 13a. In the embodiment shown, the mullion 30, 130 separates the opening 13a into a pair of openings 13b, 13c, with a corresponding French door 12 disposed over a respective opening 13b, 13c. In FIG. 5, another configuration of a mullion 230 is shown intersecting the opening 13a of the freezer compartment 13 creating two different shaped openings 13b, 13c.

As shown in the Figures, the refrigerator appliance 10 may include one or more mullions 30, 130, 230 to seal the French doors 12 of the freezer compartment 13. In the embodiments shown in the Figures, the mullion 30, 130, 230 includes one or more movable portions 32 combined with one or more fixed portions 34. The combined movable portion 32 and the fixed portion 34 of the mullion 30, 130, 230 may provide the sealing surface 31 for the gasket of one or more portions of at least one French door 12. The one or more movable portions 32 may be positionable relative to the one or more fixed portions 34 of the mullion 30, 130, 230, freezer compartment 13, freezer compartment opening 13a, housing 14, and/or shelf 20 between a sealed position (FIGS. 1, 3, and 5) and an unsealed position (FIGS. 2, 4, and 5) different from the sealed position. The movable portion 32 of the mullion 30, 130, 230 may be disposed in front of at least a portion of the one or more shelves 20 when in at least the sealed position. More specifically, the movable portion 32 may be disposed between the one or more shelves 20 and the French doors 12 when in the closed position. Further, in the embodiment shown in FIGS. 3 and 4, the movable portion 32 may remain disposed in front of the one or more shelves 20 in the unsealed position. In the embodiments shown in FIGS. 2 and 5, the movable portion 32 of the mullion 30, 230 may be disposed out from in front of the one or more shelves 20 when in the open position. When in the sealed position, the sealing surface 31 of the combined fixed portion 34 and the movable portion 32 of the mullion 30, 130, 230 sealingly engages the one or more of the French doors 12. The one or more movable portions 32 may be moved from the sealed position towards the unsealed position in a variety of ways and paths such as but not limited to pivoted (e.g. up, down, and/or side), translated (e.g. up, down, left, right, and/or inwardly/outwardly), and/or rotated. It should be understood that the mullion 30, 130, 230 and portions thereof may be a variety of constructions, materials, sizes, shapes, quantities, and orientations. The mullion, fixed portion, and/or movable portion may be a variety of materials and constructions. For example, the mullion may be made of plastic, stamped and/or painted metal (e.g. magnetic sealing surface). Moreover, for example, the sealing surface may include a metal surface. In some embodiments, the mullion or portions thereof may be entirely of metal. Moreover, one or more DC heaters (not shown) may be used with the mullion in some embodiments. The mullion, or portions thereof, may be heated. For example, contacts or a harness may be used to power the heater, if used, when the shelf 20 is in the closed position and/or the movable portion 32 is in the sealed position. Further, foam may be used to provide adequate insulation values. In the embodiments shown in at least FIGS. 1-4, the movable portion 32 may be vertically aligned with and/or above the fixed portion 34. The fixed portion 34 extends only partially or for a distance between the lower case and upper case of the housing 14 defining the freezer compartment 13. The movable portion 32 and/or fixed portion 34 may be a variety of positions/orientations relative to each other. For example as shown in FIG. 5, the movable portion 32 is vertically aligned with a lower portion 35 of the fixed portion 34, with the fixed portion 34 extending from the upper case to the lower case of the frame. Further, for example, one embodiment of the mullion may include one or more movable portions vertically positioned between an upper fixed portion and a lower fixed portion of the mullion. As shown in the Figures, the fixed portion 34 or partition of the mullion may be adapted to accommodate one or more shelves or compartment bins to retract and/or deploy from the freezer compartment 13 (e.g. through openings 13b and/or 13c). As such, the fixed portion 34 and the respective lateral side of the freezer compartment may include a sliding mechanism, rail, or the like for one or more shelves.

Although embodiments of the mullion are shown in the figures, it should be understood that the mullion, fixed portion, and/or movable portion may be of a variety of shapes, sizes, quantities, orientations, and constructions and still be within the scope of the invention. For example although a substantially vertical mullion is shown in the embodiments, a horizontal mullion or other combination of orientations/positions may include one or more fixed portions and/or movable portions to define compartments.

Figure 2:
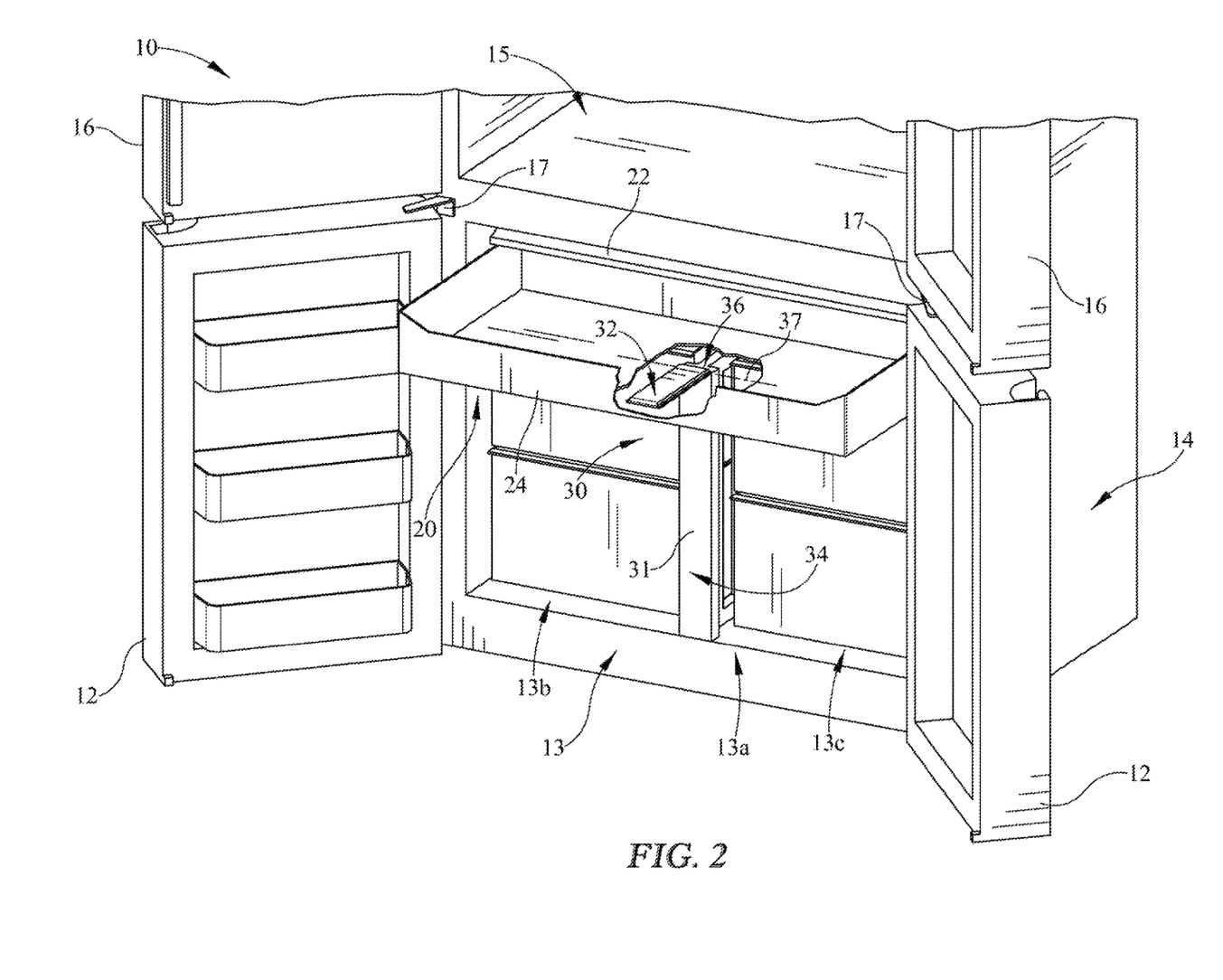
FIG. 2 is an enlarged front perspective view of the embodiment shown in FIG. 1 illustrating the one or more shelves in an open position and the movable portion of the mullion in an unsealed position.

A variety of bin compartments, containers, baskets, or shelves 20 may be received within the freezer compartment 13 for receipt and storage of food items. The one or more shelves 20 may move between a closed position (FIG. 1) and an open position (FIG. 2). The one or more shelves 20 may be disposed within the freezer compartment 13 when in the closed position and at least partially disposed outside the freezer compartment 13 when in the open position. In some embodiments, the one or more shelves 20 may be disposed outside the freezer compartment 13 in the open position when each of the French doors 12 are in the open position. Alternatively stated, the shelf 20 may not be able to extend to the open position when a single French door 12 is closed. The one or more shelves 20 may be slidably mounted within the freezer compartment 13. In this regards, the shelf may include slides or rails that are mounted on opposing sides of the shelf 20. It should be understood that other mechanisms may be used to retract and/or deploy the one or more shelves relative to the freezer compartment 13. Additionally, in some embodiments, the one or more shelves may be powered to extend/retract automatically when one or both French doors are opened/closed.

The one or more shelves 20 may be a variety of shapes, sizes, constructions, quantities, and positions with the freezer compartment 13. For example, in the embodiments shown in FIGS. 1-4, the one or more freezer shelves 20 may have a width larger than a width of the opening 13b, 13c of the freezer compartment 13 or covered by at least one door 12 when the door is in the closed position. As a result, the one or more shelves may substantially extend the entire width of the freezer compartment 13. The movable portion 32, when in at least the sealed position, is disposed in front of the shelf 20 and is subsequently displaced to the unsealed position to allow the one or more shelves to pass through a larger area of the opening 13a of the freezer compartment 13 previously interrupted by the movable portion 32 of the mullion 30, 130, 230. In some embodiments, the one or more shelves 20 may have a width less than the width of the freezer compartment 13. In the embodiment shown in FIG. 5 the shelf 20 may not extend the entire width of the freezer compartment 13, however, the shelf 20 overlaps the lower fixed portion 35 and may be wider than the opening through a door 12. Further, as shown in FIG. 5, the fixed portion 34 may extend from the top wall to the bottom wall of the freezer compartment. The fixed portion 34 is stepped to the side creating a ledge 38 for the at least one shelf 20. The ledge 38 may be substantially horizontal portion of the fixed portion 34 extending from the opening 13a towards the rear of the freezer compartment 13. The movable portion 32, when in at least the sealed position (e.g. shown in solid lines), is disposed in front of the shelf 20, adjacent the ledge 38, above the lower fixed portion 35 of the fixed portion 34 to create the sealing surface. The movable portion 32 pivots about the pivot axis 37 in relation to the upper fixed portion 39 of the mullion fixed portion 34 when the shelf 20 is deployed from the closed position to the open position.

In use, the position of the one or more freezer shelves 20 may correspondingly adjust the movable portion's 32 position relative to the fixed portion 34 of the mullion 30, 130, 230. The position of one or more freezer shelves 20 into and/or out of the freezer compartment may adjust the movable portion 32 between the sealed and unsealed position. In the embodiments shown, when the one or more freezer shelves 20 are in the closed position, the movable portion 32 may be in the sealed position. In the sealed position, the pair of freezer doors 12 may sealingly engage the sealing surface 31 of the combined fixed portion 34 and the movable portion 32 of the mullion 30, 130, 230. Moreover, when the one or more shelves 20 are in the open position the movable portion 32 may be in the unsealed position. One or more shelves may operate one or more movable portions of the mullion. In some embodiments (e.g. FIGS. 3-5), one shelf 20 may adjust one movable portion 32 of the mullion 130, 230. In other embodiments, two shelves 20, an upper shelf 22 and/or a lower shelf 24 (e.g. separately or together), may each reconfigure one movable portion 32 of the mullion 30 (FIGS. 1 and 2). In addition, in some embodiments, one shelf may reposition one movable portion and another shelf may reposition another movable portion. It should be understood that a variety of mechanisms, devices, and/or other portions of the appliance, alone or in combination with the one or more shelves, may adjust the movable portion of the mullion between the sealed and unsealed positions.

As shown in the Figures, the movement of the movable portion 32 may coincide with the movement of the one or more movable shelves 20 and/or may allow the shelves to pass through a larger area of the opening 13a of the freezer compartment 13 previously interrupted by the movable portion 32 of the mullion 30, 130, 230. In some embodiments, the movable portion 32 is disposed in front of the one or more shelves 20 in the sealed position, when the doors may be in closed position and/or the open position. The movable portion 32 of the mullion 30, 130, 230 may be displaced or repositioned between the sealed position and the unsealed positions. In some embodiments as shown in FIGS. 1, 2, and 5, the one or more freezer shelves 20 may pivot the movable portion 32 of the mullion 30, 230 at least from the sealed position towards the one or more unsealed positions. The movable portion 32 may pivot about a hinge 36 between the sealed position and the unsealed position. As shown in FIGS. 1 and 2, the movable portion 32 of the mullion 30 pivots about a hinge 36 having a pivot axis 37 being in a substantially horizontal orientation/plane. Although the hinge 36 connects the fixed portion 34 to the movable portion 32, the hinge 36 and/or movable portion 32 may be a variety of orientations, positions (e.g. sealed and/or unsealed positions), constructions, shapes, sizes, and still be within the scope of the invention. For example, the hinge 36 of the movable portion 32 may be in a substantially vertical orientation/plane as shown in FIG. 5. Moreover, as shown in FIG. 5, the movable portion 32 swings or pivots to the side instead of upwards and/or downwards (FIG. 2). In some embodiments, one or more movable portions 32 may be hingedly attached to the housing 14 (e.g. surrounding the opening 13a) instead of or in combination with being attached to the fixed portion 34 of the mullion as shown.

The movable portion 32 may be positioned from the unsealed position to the sealed position and/or from the sealed position to the unsealed position in a variety of ways and constructions. In the embodiments shown in FIGS. 1, 2, and 5, the movable portion 32 may include one or more torsional springs (not shown). Once the shelf is closed or retracted, the movable portion 32 may be under spring torsion and is urged to return to the sealed position or disposed back in front of the one or more shelves to create the sealing surface for the pair of freezer doors. If a spring is used in some embodiments, a damper may be included. In some embodiments, a user may need to return the movable portion 32.

The movable portion of the mullion may be moved or repositioned in a variety of ways between the sealed position and the unsealed position, not limited to pivoting shown in FIGS. 1, 2, and 5. In some embodiments, the mullion may translate (e.g. linear direction) between the sealed position and the unsealed position. As shown in FIGS. 3 and 4, the movable portion 32 of the mullion 130 translates with the one or more shelves 20. The movable portion 32 may be fixedly attached to the one or more freezer shelves 20. The shelf 20 may include a front side 26 adjacent the opening 13a of the freezer compartment 13 and an opposing back side. The movable portion 32 of the mullion 130, attached to the font side 26 of the shelf, is positionable between the closed position (FIG. 3) and the open position (FIG. 4) with the freezer shelf 20. The movable portion 32 may travel or be carried with the one or more freezer shelves 20 from the closed position (FIG. 3) to the open position (FIG. 4). The movable portion 32 of the mullion 130 is attached to the front side 26 of the shelf 20 (e.g. disposed in front of the shelf 20) and is in the sealed position with the fixed portion 34 of the mullion 130 when the shelf 20 is in the closed position. When the shelf 20 is in the open position, the movable portion 32 is in the unsealed position, and may also be described as being disposed in front of the shelf in some embodiments. Further, the movable portion 32 returns to the sealed position (FIG. 3) with the shelf when the shelf 20 retracted to the closed position. In some embodiments, if a heater is used, an electrical connection may be restored when the movable portion 32 returns to the sealed position.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. An appliance having a freezer compartment comprising:
   a housing having the freezer compartment and defining an opening into the freezer compartment;
   a pair of freezer doors rotatably attached adjacent the opening into the freezer compartment to the housing, each freezer door of the pair of freezer doors having an open position and a closed position to allow access to the freezer compartment;

one or more freezer shelves slidably mounted within the freezer compartment, wherein the one or more freezer shelves is disposed within the freezer compartment when the one or more freezer shelves is in a closed position, and is at least partially disposed outside the freezer compartment when the one or more freezer shelves is in an open position and each of the freezer doors is in the open position;

a mullion separating the opening into a pair of openings, wherein the mullion includes a fixed portion and a movable portion combining to provide a sealing surface for receipt of the pair of freezer doors;

wherein the movable portion of the mullion is positionable relative to the fixed portion of the mullion between a sealed position and an unsealed position different from the sealed position, wherein when the one or more freezer shelves is in the closed position the movable portion is in the sealed position and the pair of freezer doors sealingly engage the sealing surface of the combined fixed portion and the movable portion of the mullion, and wherein when the one or more shelves is in the open position the movable portion is in the unsealed position; and wherein when the one or more freezer shelves deploys from the closed position, the one or more freezer shelves actuates the movable portion of the mullion to pivot from at least from the sealed position, and wherein the moveable portion pivots about a hinge, wherein a pivot axis of the hinge is substantially horizontal.

2. The appliance of claim 1 wherein the one or more freezer shelves actuates the movable portion of the mullion to pivot from the unsealed position to the sealed position.

3. The appliance of claim 1 wherein the movable portion of the mullion is not carried by the one or more freezer shelves from the closed position to the open position.

4. The appliance of claim 1 further comprising a heater adjacent the mullion.

5. The appliance of claim 1 wherein the one or more freezer shelves has a width larger than a width of the opening within the freezer compartment covered by at least one of the freezer doors of the pair of freezer doors when the at least one freezer door is in the closed position.

6. The appliance of claim 1 further comprising a fresh-food compartment.

7. A shelf system for a freezer compartment having a pair of French doors comprising:

one or more freezer shelves each having a front side and an opposing back side, wherein the one or more freezer shelves is slidably mounted within the freezer compartment, wherein the one or more freezer shelves is disposed within the freezer compartment when the one or more freezer shelves is in a closed position and is at least partially deployed outside the freezer compartment when the one or more freezer shelves is in an open position;

at least one portion of a mullion is in a sealed position and disposed in front of the front side of the one or more freezer shelves when the one or more freezer shelves is in the closed position, and wherein deployment of the one or more freezer shelves from the closed position to the open position displaces the at least one portion of the mullion to an unsealed position; and the at least one portion of the mullion is pivotably connected to a fixed portion of the mullion, wherein the at least one portion of the mullion does not travel with the one or more freezer shelves from the closed position to the open position and is pivoted between the sealed position and the unsealed position about a hinge, wherein a pivot axis of the hinge is substantially horizontal.

8. The shelf system of claim 7 wherein the at least one portion of the mullion returns to the sealed position when positioning the one or more freezer shelves to the closed position.

9. The shelf system of claim 7 wherein the at least one portion of the mullion includes a stationary hinge axis.

10. The shelf system of claim 7 wherein the at least one portion in the sealed position and the fixed portion of the mullion combine to provide a sealing surface for receipt of the pair of French doors.

11. The shelf system of claim 7 in combination with an appliance having the freezer compartment.

12. A method of sealing French doors on a freezer compartment comprising the steps of:

providing the freezer compartment with an opening thereto;

providing the pair of freezer doors rotatably attached to a housing adjacent the opening, each of the freezer doors having an open position and a closed position to allow access to the freezer compartment;

providing one or more freezer shelves mounted within the freezer compartment, wherein the one or more freezer shelves is disposed within the freezer compartment when the one or more freezer shelves is in a closed position and is at least partially disposed outside the freezer compartment when the one or more freezer shelves is in an open position and each of the freezer doors are in the open position;

providing a mullion separating the opening into a pair of openings, wherein the mullion includes a fixed portion and a movable portion combining to provide a sealing surface for receipt of the pair of freezer doors;

moving the one or more freezer shelves from the closed position to the open position, thereby repositioning the movable portion of the mullion from a sealed position to an unsealed position;

pivoting the movable portion of the mullion from the sealed position to the unsealed position;

actuating the step of pivoting the movable portion of the mullion from the sealed position to the unsealed position by the step of moving the one or more freezer shelves from the closed position to the open position; and wherein the step of pivoting the movable portion of the mullion from the sealed position to the unsealed position includes pivoting the moveable portion abut a pivot axis that is horizontally orientated.

13. The method of claim 12 further comprising the step of moving the one or more freezer shelves from the open position to the closed position, thereby actuating the movable portion of the mullion from the unsealed position to the sealed position.

14. The method of claim 12 further comprising the step of heating the mullion.

* * * * *